April 15, 1941.    N. MORRIS    2,238,425
KITCHEN IMPLEMENT
Filed May 9, 1938
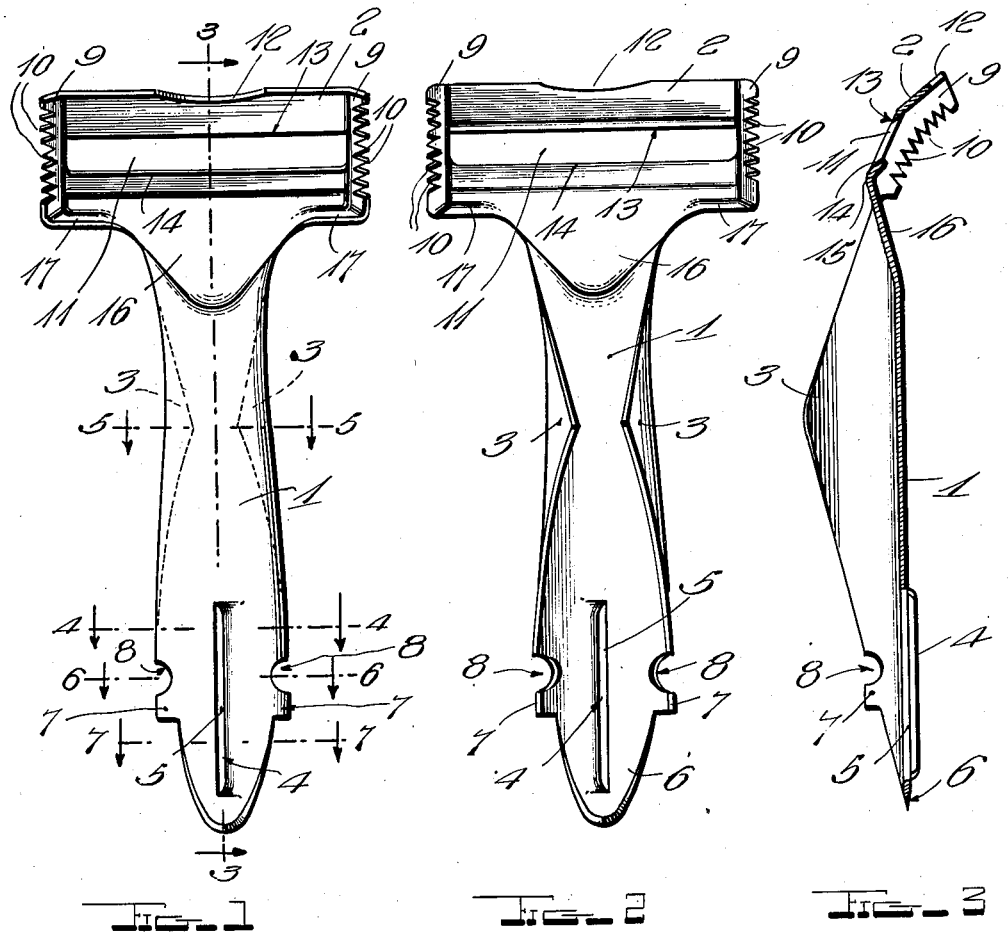
INVENTOR.
Nathan Morris
BY Jacobi & Jacobi
ATTORNEYS.

Patented Apr. 15, 1941

2,238,425

UNITED STATES PATENT OFFICE 2,238,425

KITCHEN IMPLEMENT

Nathan Morris, Asbury Park, N. J.

Application May 9, 1938, Serial No. 206,910

1 Claim. (Cl. 30—316)

This invention relates to kitchen implements and it is one object of the invention to provide an implement of such formation that it constitutes an assembly of a number of implements used in a kitchen when preparing food, the assembled implements having such relation to the handle portion of the compound device that the handle portion may be grasped when using any of the individual implements.

Another object of the invention is to so form the rear end portion of the handle that it will serve as means for peeling an orange or cutting radishes and the like to form rose petals or other fanciful shapes in addition to constituting a penetrating point of an apple corer formed by the handle, tongues being formed at opposite sides of the handle to provide abutments for limiting insertion of the penetrating end of the handle when it is used for forming rose petals and also serve as means for removing defective kernels from an ear of corn.

Another object of the invention is to provide a handle which will not only serve as an apple corer but is formed with a blade constituting a paring blade for removing skin from apples and potatoes.

Another object of the invention is to provide a cross head at the opposite end of the handle from its penetrating point, the cross head being slotted and formed with a blade along one side edge of the slot for slicing vegetables and a transversely curved surface being formed along the other side edge of the slot to provide a fulcrum upon which the head may be rocked to cause a slice of a desired thickness to be cut.

Another object of the invention is to so form ends of the cross head that they will be provided with flanges having serrated edges by means of which corn on the cob may have the skin or hulls of its kernels cut and thus permit the corn to be eaten from the cob without detaching the hulls therefrom.

Another object of the invention is to provide the cross head with means for scraping the corn from the cob after the kernels have been slit by the serrated flanges at ends of the cross head.

Another object of the invention is to provide a kitchen implement of the compound type which may be shaped from a single sheet metal blank, thus reducing parts to a minimum and providing an implement which can be cheaply manufactured and sold at a low price.

The invention is illustrated in the accompanying drawing wherein:

Fig. 1 is a view looking at the back or upper face of the implement.

Fig. 2 is a view looking at the front or under face of the implement.

Fig. 3 is a sectional view taken longitudinally through the implement along the line 3—3 of Fig. 1.

Fig. 4 is a sectional view taken transversely through the handle along the line 4—4 of Fig. 1.

Fig. 5 is a transverse section taken midway the length of the handle along the line 5—5 of Fig. 1.

Fig. 6 is a sectional view taken along the line 6—6 of Fig. 1.

Fig. 7 is a sectional view taken along the line 7—7 of Fig. 1.

This improved compound kitchen implement is formed from a single blank of sheet metal and has a handle 1 of sufficient length to be conveniently held in a person's hand and a cross head 2 at the forward or outer end of the handle. The portion of the blank forming the handle has side extensions forming side walls or wings 3 for the handle having a substantially tubular intermediate portion which is, however, open along its under side. The handle is gradually increased in width or diameter towards its rear end as shown in Figs. 1, 2 and 5 and upon referring to Fig. 3 it will be seen that the side wings or walls gradually decrease in depth towards opposite ends of the handle. The free rear end portion of the handle will thus be gradually flattened to a great extent as shown in Figs. 4, 6 and 7 but will still be somewhat curved transversely as shown in these figures. The longitudinal contour of the handle permits it to be easily grasped in a person's hand and firmly gripped and the transverse curvature permits the handle to be rocked transversely when using the implement for peeling potatoes or apples. The blade 4 used when paring potatoes or apples is formed by cutting a longitudinally extending slit in the rear portion of the handle and then pressing the metal along one side of the slit downwardly and sharpening it along the slit as shown in Figs. 4, 6 and 7 to provide a cutting edge. The slit then provides a passage 5 through which the parings pass as they are cut by the blade 4. By having the handle curved transversely a curved surface is provided in advance of the blade and forms a fulcrum surface upon which the handle is rocked to cause the blade to cut a paring of the desired thickness.

The rear end of the handle is tapered to form a penetrating point 6 which is sharpened in order that it may be easily forced into an apple when the handle is used for coring an apple. This tapered end which may be referred to as a penetrating blade may also be used as a blade for removing eyes from pineapples or as a blade adapted to be forced into a radish or the like to form arcuate cuts therein and form the radish into a "rosebud" for a vegetable salad. Tongues or arms 7 project laterally at opposite sides of the upper end of the blade 6 to act as abutments for limiting insertion of the blade during use of the blade to cut a radish into a rosebud. These tongues may be sharpened at their ends or blunt as shown in Fig. 2 and these tongues constitute prongs or short blades for removing defective kernels from ears of corn. Recesses 8 are formed at sides of the handle in front of the tongues so that use of the tongues will not be interfered with.

The cross head 2 may be grasped when using the handle as a core remover and thus permit a turning movement to be imparted to the handle and the blade 6 and body of the handle forced longitudinally through an apple about the core. During this core removing operation, the blade 4 will assist in cutting the core free from the apple and the core will be shifted upwardly between the wings or side walls of the handle where it will be frictionally gripped and firmly held during withdrawal of the handle from the apple.

Ends of the cross head are bent to form flanges 9 which are serrated to form fine teeth 10 used for slitting the shells of kernels of an ear of corn so that when the corn is cooked or eaten from the cob, the pulp of the kernels will be removed and the shells remain attached to the cob and not become caught between the teeth or swallowed and cause irritation in the stomach. The cross head is bent along the front side edge of the slot 11 as shown in Fig. 3 so that the flanges 9 will be curved or arcuate as shown in this figure. This curvature causes the flanges to conform to the curvature of an ear of corn and when the device is held by the handle one of the flanges may be brought into contact with the kernels and the device then moved along the ear so that the teeth of the flanges will slit the skins or shells of the kernels. As there has been provided a flange at each end of the cross head, the device may be held in either the right or left hand according to whether the person using the device is right-handed or left-handed. A recess 12 is formed in the front side edge of the cross head midway the length thereof so that after the kernels have been slit the curved edge of this recess may be disposed in engagement with the ear of corn and the device moved along the ear to expel the pulp from the kernels.

The device is also to be used for slicing potatoes for frying and for cutting cabbage for making slaw. In order to do so, the metal of the cross head is sharpened along the front side edge of the slot 11 to form a cutting edge or blade 13 and along the rear side edge of the slot, the metal is bent to form a lip 14 which assists in directing a slice of potato or cabbage through the slot 11 and in addition forms a transversely curved surface 15 constituting a fulcrum upon which the cross head is rocked to cause the blade 13 to cut a slice of the desired thickness. When the cross head is bent to form the lip 14 and fulcrum 15, the flattened forward end portion 16 of the handle which forms a thumb rest will be caused to extend forwardly at a downward incline to its junction with the cross head. Ends of the rear side edge of the cross head are bent to form flanges 17 which reinforce the rear corner portions of the cross head and prevent them from being bent out of shape.

I have, therefore, provided a kitchen implement by use of which apples, potatoes and other fruits and vegetables may be easily prepared for cooking or skins easily removed from oranges and the like.

From the foregoing description of the construction of my improved device, the operation thereof and the method of applying the same to use, will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

In a kitchen implement of the character described, an elongated body arcuate in cross section and having side walls gradually decreasing in depth toward its front end to provide sloping side edges, the forward end portion of said body constituting a penetrating blade for removing eyes from pineapples, the said blade being arcuate in cross section and having sharp side edges, and tongues at opposite sides of said body at the inner ends of the sharp side edges of said blade extending outwardly from the body in conformity with the curvature thereof and constituting abutments extending laterally from opposite sides of the inner end of the blade to limit the extent the blade may be forced into a pineapple when removing eyes from the pineapple.

NATHAN MORRIS.